United States Patent
Wijnands et al.

(10) Patent No.: US 7,269,106 B2
(45) Date of Patent: Sep. 11, 2007

(54) POWER EFFICIENT SCHEDULING FOR DISC ACCESSES

(75) Inventors: Rudi Jozef Marie Wijnands, Eindhoven (NL); Jozef Pieter Van Gassel, Eindhoven (NL); Johannes Henricus Maria Korst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 105 days.

(21) Appl. No.: 10/542,138

(22) PCT Filed: Dec. 24, 2003

(86) PCT No.: PCT/IB03/06342

§ 371 (c)(1),
(2), (4) Date: Jul. 12, 2005

(87) PCT Pub. No.: WO2004/066293

PCT Pub. Date: Aug. 5, 2004

(65) Prior Publication Data

US 2006/0062112 A1    Mar. 23, 2006

(30) Foreign Application Priority Data

Jan. 17, 2003    (EP)  .................................. 03100091

(51) Int. Cl.
*G11B 5/09* (2006.01)

(52) U.S. Cl. ................. 369/47.23; 369/47.5; 369/47.1; 369/53.1

(58) Field of Classification Search ..................... None
See application file for complete search history.

(56) References Cited

U.S. PATENT DOCUMENTS 5,442,608 A * 8/1995 Umeda et al. ........... 369/44.27
6,496,456 B2 * 12/2002 Ueki ....................... 369/47.33

FOREIGN PATENT DOCUMENTS

| WO | WO 01/82301 A2 | 11/2001 |
| WO | WO 01/82301 A3 | 11/2001 |

* cited by examiner

*Primary Examiner*—Muhammad Edun
(74) *Attorney, Agent, or Firm*—Michael E. Belk

(57) ABSTRACT

A device for scanning a record carrier has a head for scanning a track for reading and/or writing information. A disc scheduler controls receiving requests for accessing the record carrier, the requests including streaming requests regarding real time information and auxiliary requests (44) regarding auxiliary information. The disc scheduler reduces power consumption of the device by switching the scanning means to a stand-by mode when no requests are pending and switching the scanning means to an operational mode when a request has to be executed. The auxiliary requests are executed in a processing interval (45) in combination with a selected one of the streaming requests. Hence the number of spin-ups of the record carrier is reduced.

12 Claims, 3 Drawing Sheets

Figure 3:
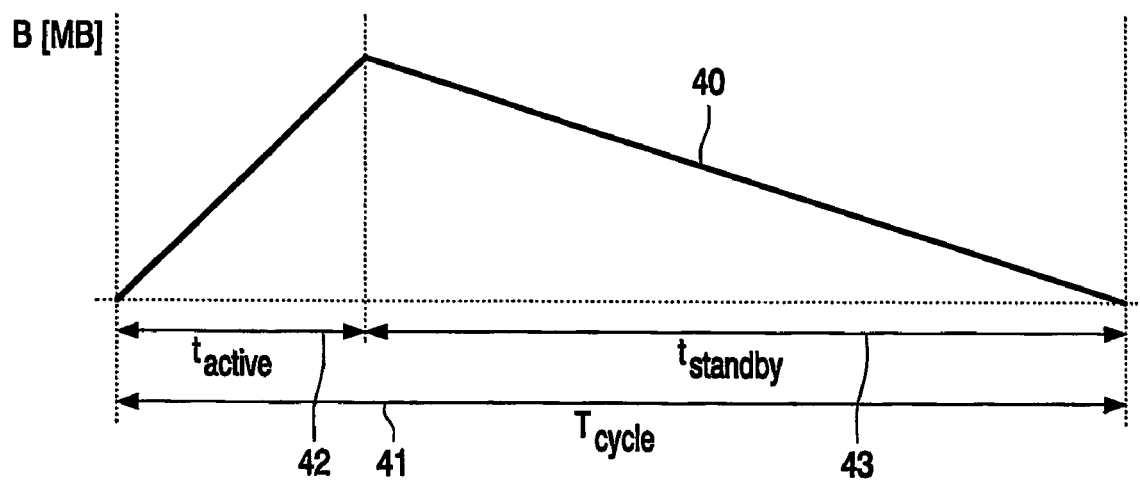

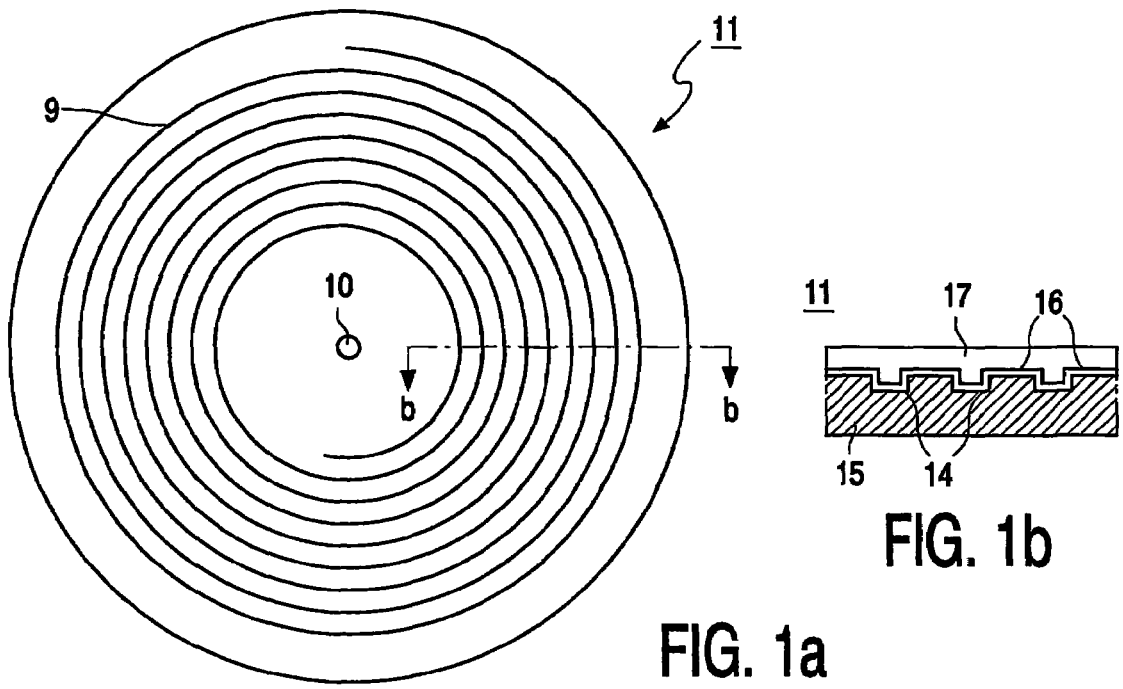
FIG. 1a
FIG. 1b
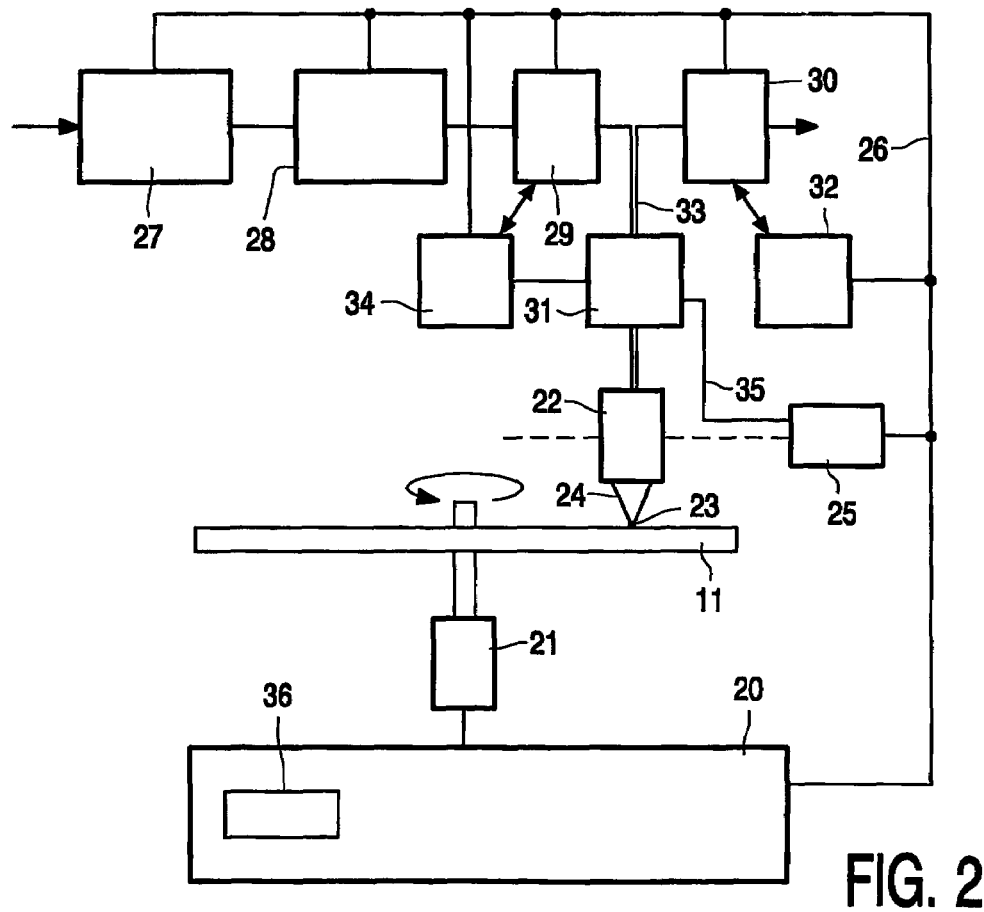
FIG. 2

POWER EFFICIENT SCHEDULING FOR DISC ACCESSES

The invention relates to a device for scanning a record carrier having a track for carrying information, the device comprising scanning means including drive means for rotating the record carrier and a head for scanning the track for reading and/or writing the information.

The invention further relates to a method of controlling scanning a record carrier having a track for carrying information.

In particular the invention is relevant for power management of magnetical and (magneto-) optical storage devices.

A storage device and method for power management is known from WO01/82301. During a burst read mode the storage device reads data from a record carrier into a buffer at a high speed. The data from the buffer is transferred to a host device at a lower speed. The device powers down read/write components to a stand-by mode when the buffer contains sufficient data. When the buffer is emptied to a predetermined level the device switches the components from the stand-by mode to an operational mode, and a new burst read mode cycle is started. A similar process is described for a burst write mode. Data from a host device is received at a low rate and stored in a buffer, while write components are in a stand-by mode. When the buffer is filled to a predetermined level a burst write mode cycle is started, in which the write components are switched to the operational state and data is written to the record carrier at a high speed until the buffer is empty. A problem of the known device is that there is no option of handling auxiliary data access requests in a power efficient way.

Therefore it is an object of the invention to provide a device and a method for storing and retrieving information that is more versatile for handling data access requests.

According to a first aspect of the invention the object is achieved with a device as defined in the opening paragraph, which device comprises scanning means including drive means for rotating the record carrier and a head for scanning the track for reading and/or writing the information, and control means for controlling the scanning, the control means including a disc scheduler for receiving requests for accessing the record carrier, the requests including streaming requests regarding real time information and auxiliary requests regarding auxiliary information, for reducing power consumption by switching the scanning means to a stand-by mode when no requests are pending and switching the scanning means to an operational mode when a request has to be executed, and for executing the auxiliary requests in combination with a selected one of the streaming requests.

According to a second aspect of the invention the object is achieved with a method as defined in the opening paragraph, which method comprises receiving requests for accessing the record carrier, the requests including streaming requests regarding real time information and auxiliary requests regarding auxiliary information, reducing power consumption by switching scanning means to a stand-by mode when no requests are pending and switching the scanning means to an operational mode when a request has to be executed, and executing the auxiliary requests in combination with a selected one of the streaming requests.

According to a third aspect of the invention the object is achieved with a computer program product for storing information, which program is operative to cause a processor to perform the method.

The effect of combining the execution of a streaming request and at least one auxiliary request is that the scanning means are to be powered up only once. During the power switch from stand-by to operational mode the disc must be driven to a rotation speed suitable for reading and/or writing, and has to be powered down after finalizing the combined execution. The number of so called spin-up cycles (or load and unload processes) is limited by the combining. This has the advantage that power consumption and wear of the device is reduced.

The invention is also based on the following recognition. The streaming requests will arrive at substantially regular intervals and have to be processed because the streaming application is time critical. The inventors have seen that the auxiliary requests can be considered as less time critical, and are called best-effort requests. For reducing power such best-effort requests can be executed in combination with the streaming requests. For non time critical auxiliary data (like background applications) there is no performance penalty at all. Response time critical applications may suffer a slight reduction in performance, which can be further reduced as described in the embodiments below.

In an embodiment of the device the device comprises a buffer for temporarily storing the information, and the control means are arranged for generating the streaming requests based on a filling level of streaming information present in the buffer. This has the advantage that the disc scheduler can be easily informed about the streaming requests.

In an embodiment of the device the disc scheduler is arranged for said combining by executing an auxiliary request and immediately thereafter generating and executing a streaming request independently of the filling level. This has the effect that after an intermediate auxiliary request a full stand-by period of the spin-up cycle will follow. This has the advantage that the number of spin-up cycles is reduced.

In an embodiment of the device the disc scheduler is arranged for said combining by postponing executing an auxiliary request until immediately after executing a streaming request. No separate spin-up cycle is needed for the auxiliary request. This has the advantage that the number of spin-up cycles is reduced.

In an embodiment of the device the disc scheduler is arranged for said combining by determining an expected execution period for a received auxiliary request and by determining a start time for executing a next streaming request, and by postponing executing the received auxiliary request until said start time minus said period or by, in the event that the period extends beyond the start time, starting executing a first part of the received auxiliary request or postponing executing the received auxiliary request until after executing the streaming request. No separate spin-up cycle is needed for the auxiliary request. This has the advantage that the number of spin-up cycles is reduced, and the auxiliary request is processed earlier.

In an embodiment of the device the disc scheduler is arranged for discriminating a received auxiliary request in a high-priority request or a low-priority request, and for, in the event of a high-priority request, immediately executing the high-priority request. This has the advantage that high-priority requests are processed without delay, while low-priority requests are processed without separate spin-up cycle.

In an embodiment of the device the disc scheduler is arranged for reading additional data immediately following requested data, storing the additional data and, in the event of a next auxiliary request requiring the additional data, providing said stored additional data. This has the advantage that, in the event that the next request requires a limited amount of data, the next request can be serviced without separate spin-up cycle. In a further embodiment of the device the disc scheduler is arranged for discriminating a received auxiliary request in a large-size data request and a small-size data request, and for, only in the event of a small-size read request, reading said additional data This has the advantage that in the event of a small-size data request a higher probability exists that the next request will also be a small-size request and can be serviced based on stored additional data without a separate spin-up cycle.

In an embodiment of the device the disc scheduler is arranged for interrupting the execution of a streaming request for executing an auxiliary request, and/or for interrupting the execution of an auxiliary request for executing a streaming request. This has the advantage the auxiliary request is processed as early as possible at least partly and the streaming request is processed as required, e.g. providing a sufficient filling degree of a buffer to survive the processing of the auxiliary request.

Further preferred embodiments of the devices and method according to the invention are given in the claims.

Figure 4:
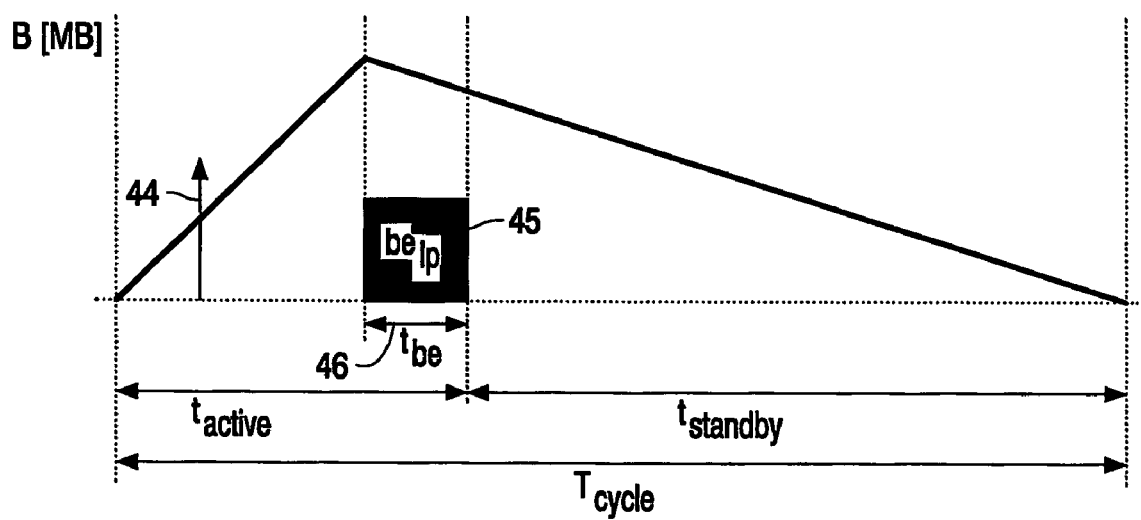
Figure 5:
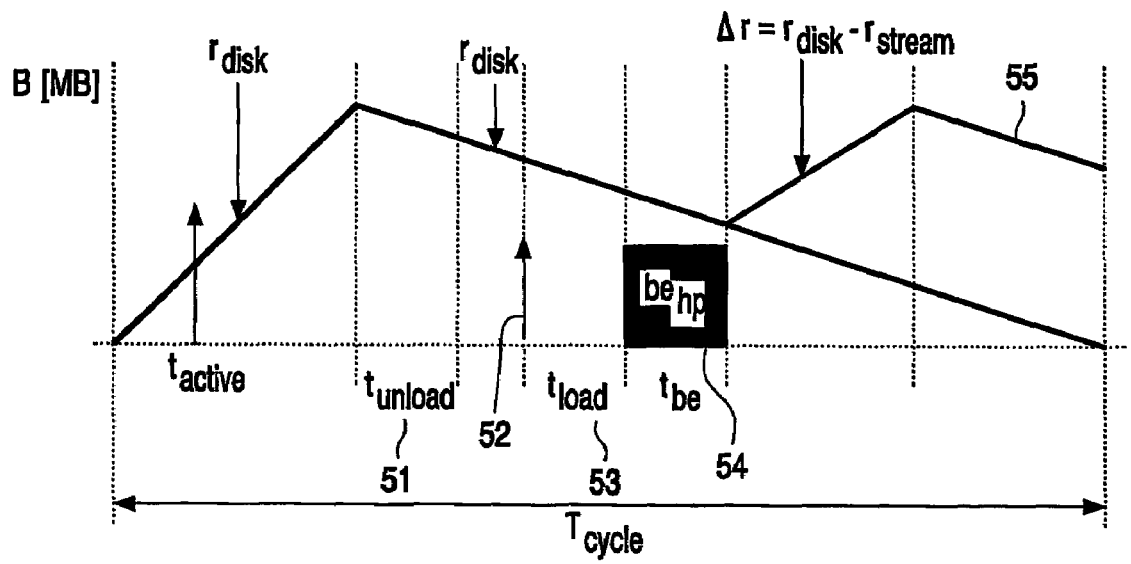
Figure 6:
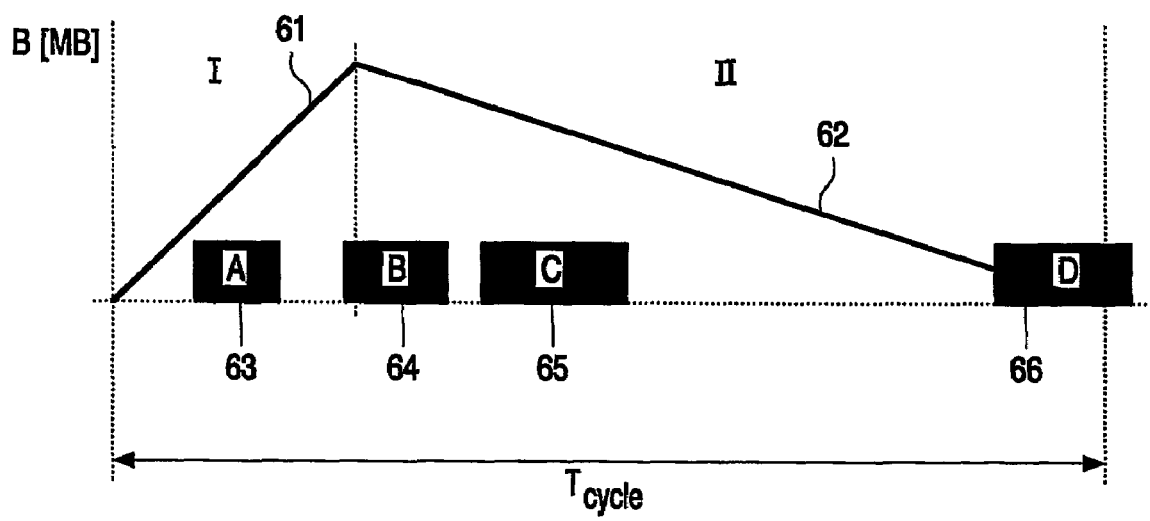

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a scanning device for accessing a record carrier, FIG. 3 shows a storage cycle of a real-time data stream, FIG. 4 shows serving best-effort disk access immediately after processing a streaming request, FIG. 5 shows processing of a high-priority auxiliary request, and FIG. 6 shows a number of different situations for arrival of a request.

In the Figures, elements which correspond to elements already described have the same reference numerals. It is to be noted that timing aspects in the FIGS. 3-6 are not drawn to scale.

FIG. 1a shows a record carrier. The disc-shaped record carrier 11 has a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of read-only or a recordable type. An example of a read-only type is a CD, and examples of a recordable disc are the CD-R and CD-RW, and DVD read-only and writable versions of DVD, such as DVD+RW, and the high density writable optical disc using blue lasers, called Blu-ray Disc (BD). Further details about the DVD disc can be found in reference: ECMA-267: 120 mm DVD—Read-Only Disc—(3$^{rd}$ Edition April 2001). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure comprises position information, e.g. addresses, for indication of the location of units of information, usually called information sectors or blocks. The position information includes specific synchronizing marks for locating the start of such information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. A pregroove 14 enables a read/write head to follow the track during scanning. The pregroove for example constitutes the track structure. The pregroove 14 may be implemented as an indentation or an elevation of the substrate 15 material, or as a material property deviating from its surroundings.

Alternatively the record carrier 11 is a magnetic record carrier like a hard disk well known from computer applications. Such a record carrier has a concentric pattern of circular tracks, and has a magnetic recording layer. The hard disk is usually produced in combination with a device for writing and reading as a so called had disk drive (HDD). The HDD is also suitable for consumer applications like audio and video players, and for portable applications provided the power consumption is controlled as described below.

The record carrier 11 is intended for carrying any type of digital information, for example in files representing digitally encoded real-time information like LPCM, MP3, or video according to a standardized format like MPEG2. The information on the disc is stored in blocks or sectors, for example for CD having a size of 2048 user bytes. Such sectors are addressable and retrievable units of information, usually called blocks, are provided with error correcting codes. In general data is requested from the record carrier, e.g. by a real-time processor or a host system, in requests specifying the amount of data blocks and the logical addresses thereof. For real-time data like video or audio a data stream must be maintained at a required rate to achieve a continuous reproduction. Requests for such real-time data require processing within strict response time limits, and are called streaming requests. Other data is requested from the record carrier by a hosts system in requests specifying the amount of data blocks and the logical addresses thereof. Such requests are called auxiliary requests. The auxiliary requests may contain a priority indication as to the required response time, e.g. background tasks without timing requirements having a low priority or user interactive applications requiring a high priority. An application programmer's interface (API) for communicating between the host system and the device for accessing the record carrier is defined including such priority indications.

FIG. 2 shows a scanning device for accessing a record carrier. It is to be noted that scanning includes reading and or writing marks in a track of the record carrier depending on the type of device, i.e. a read-only or read/write type. The device is provided with means for scanning a track on a record carrier 11 which means include a drive unit 21 for rotating the record carrier 11, a head 22, and a servo unit 25 for positioning the head 22 opposite the track. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The main scanning signal 33 is processed for detecting the main digital information from the marks by read processing unit 30 of a usual type including a demodulator, deformatter and output unit.

The device has a control unit 20 for controlling the scanning and retrieving of information. The control unit 20 includes a disc scheduler 36 for receiving requests for accessing the disc such as streaming requests for real time data and auxiliary requests for other data, e.g. commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. The disc scheduler 36 performs the functions of receiving and processing requests for accessing the record carrier, the requests including streaming requests regarding real time information and auxiliary requests regarding auxiliary information. Furthermore the scheduler has the function of reducing power consumption by switching the scanning elements to a stand-by mode when no requests are pending and switching the scanning elements to an operational mode when a request has to be executed, and of executing the auxiliary requests in combination with a selected one of the streaming requests as described below.

In an embodiment the device is a recording device which is provided with means for recording information on a record carrier of a type, which is writable or re-writable, for example CD-R or CD-RW, or DVD+R, DVD+RW or BD. The recording device comprises write processing means for processing the input information to generate a write signal to drive the head 22, which means comprise an input unit 27, a formatter 28 and a modulator 29. The modulator 29 is coupled to the front end unit 31 that controls the radiation for writing information. The radiation of the beam is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

In an embodiment of the device the record carrier is a magnetic record carrier, and the head is a magnetic head for reading and writing magnetic marks. Such a magnetic disk device is usually called a hard disk drive (HDD). Corresponding elements as described for the optical device are included, in particular the disc scheduler 36.

In an embodiment the device comprises a buffer unit 32 for temporarily storing data blocks of a real-time data stream retrieved from the record carrier. Real time data is read from the buffer unit 32 while the scanning elements are in a stand-by mode. A filling degree is detected in the buffer unit 32 which is coupled to the control unit via the control lines 26. The control unit 20 is arranged for generating streaming requests based on the filling level of streaming information present in the buffer unit. In particular, when the filling level is below a predetermined level, the scanning elements are powered up to the operational state, i.e. the motor is driven to rotate the record carrier and the head 22 is positioned as required to access the required data.

In an embodiment the recording device comprises a write buffer unit 34 for temporarily storing data blocks of a real-time data stream to be recorded on the record carrier. Real time data is written to the write buffer unit 34 while the scanning elements are in a stand-by mode. A filling degree is detected in the write buffer unit 34 which is coupled to the control unit via the control lines 26. The control unit 20 is arranged for generating streaming requests based on the filling level of streaming information present in the buffer unit. In particular, when the filling level is above a predetermined level, the scanning elements are powered up to the operational state, i.e. the motor is driven to rotate the record carrier and the head 22 is positioned as required to write the stored data to the required track.

For portable disc based streaming devices such as portable audio/video players, the total playing time (i.e. battery life) is one of the key features. Since the power consumed by the storage module alone, e.g. a small form factor optical unit (SFFO) or a hard disk drive (HDD), is usually a substantial part of the total dissipated power, special precautions should be taken. To provide real-time guarantees for disk accesses, a disk access scheduler is included. The disk scheduler orders disk access requests from applications to guarantee real-time disk performance and minimizes power consumption of the device.

FIG. 3 shows a storage cycle of a real-time data stream. Curve 40 indicates the buffer filling of a single stream in case of reading from the storage medium. Arrow 41 indicates $T_{cycle}$, which is the duration of one cycle. Arrow 42 indicates $t_{active}$, which is the time during which data is read from the disk for the streaming application. Arrow 43 indicates $t_{standby}$, which is time during which the disk device is put into standby mode to reduce power consumption. A stream buffer, e.g. in a host device or buffer unit 32, is being filled during $t_{active}$. During this time, data is read from the disk device and put into the stream buffer. When the streaming buffer is full, the disk device is put into standby mode for a time equal to $t_{standby}$. During this time the application requesting the data can consume the data from the buffer. Let $r_{steam}$ be the bit rate of the application stream. Let $r_{disk}$ be the maximum sustained bit rate of the disk device. Let B be the stream buffer size. Then the following functions can be applied:

$$t_{active} = \frac{B}{r_{disk} - r_{stream}}$$

$$t_{standby} = \frac{B}{r_{stream}}$$

The bit rate at which the buffer is filled can be equal to the maximum sustained bit rate $r_{disk}$ of the disk device. The bit rate at which the application empties the stream buffer can be equal to the stream bit rate $r_{stream}$. Note that the effective filling rate of the buffer equals $r_{disk}-r_{stream}$ since the buffer is also being emptied during filling.

The storage cycle as shown in FIG. 3 and described above does not take into account that there might be disk accesses that do not require real-time guarantees. Such disk accesses are referred to as best-effort disk accesses. Typically best-effort disk accesses have a non-deterministic nature. Assume a best-effort disk access request is issued to the scheduler during the standby time $t_{standby}$. The disk device is in standby mode and no data can be stored/retrieved, unless the disk device is made active again. Consequently, the advantage of putting the disk device into standby mode is jeopardised. Putting the disk device into standby mode again after making it active and serving the best-effort request(s) is not energy efficient (since spinning up- and down the drive costs a significant amount of energy). Hence the disc scheduler is provided with the function of combining the best-effort requests with a streaming request, which provide a power efficient way for dealing with best-effort requests. The combination is for example achieved by processing the best-effort request immediately after or before processing a streaming request, which has to be serviced anyway. Furthermore a best-effort request may be used as a new starting point for a storage cycle, or best-effort requests may be combined or ordered.

FIG. 4 shows serving best-effort disk access immediately after processing a streaming request. A best effort request 44 arrives anywhere during the cycle, but is processed just after refilling the buffer during period 45 named $t_{be}$ indicated by arrow 46. Processing best-effort requests reduces the time available for streaming accesses. To assure that the stream can still be served, some special precautions should be taken. The best effort requests are scheduled directly after refilling the real-time buffer because this simplifies the scheduler's complexity and buffer under runs cannot occur, provided that the best effort request does not exceed the drive's standby time. In the event that the best-effort request arrives during $t_{active}$ a slight decrease in the response time to the best-effort request occurs, i.e. maximally equal to $t_{active}$. Since we are discussing best effort requests that have a lower priority than streaming requests, this is not an issue.

In an embodiment a distinction is made between low-priority and high priority best-effort disk accesses. E.g. user interaction with the system would typically produce high-priority best-effort disk accesses, because the user of the system does not want to wait for several seconds for a response of the system. Data administration or background tasks will typically produce low-priority best-effort disk accesses. To deal with both low-priority and high-priority best-effort disk accesses, the following solutions are given. Low-priority best-effort disk access are collected and served at the beginning of each cycle, i.e. directly after refilling the buffer. This eliminates real-time buffer under runs during refilling. Note that the collected best-effort requests can be optimised for seeking and furthermore that best-effort requests during refilling are possible as long as there is enough real-time data in the buffer to overcome the high-priority best-effort request.

In an embodiment best-effort requests are interrupted when required for processing a streaming request. In the case where processing a best-effort request (or the total of pending best-effort requests) exceeds the standby time, the best-effort request needs to be split up into different parts that will be served in different cycles. For example a first part of the request is processed in a first cycle up to the time that a streaming request needs to be processed, and then interrupted. The remaining part of the interrupted best-effort request is processed immediately after refilling the buffer. Hence no buffer under runs will occur and the energy is reduced since the drive needs to spin-up and down at most once per cycle.

Alternatively or additionally best-effort disk access are served at the end of the stand-by period of a cycle, i.e. just before processing a streaming request. The combining is performed by determining an expected execution period for a received auxiliary request and by determining a start time for executing a next streaming request, and by postponing executing the received auxiliary request until said start time minus said period. In the event that the determined execution period extends beyond the start time, the execution of the received auxiliary request is postponed until after executing the streaming request, or started and subsequently interrupted as described above.

FIG. 5 shows processing of a high-priority auxiliary request. A streaming cycle is shown as in FIG. 3. After the processing of the streaming request during $t_{active}$ the record carrier is put to stand-by mode, which in practice involves a power-down period 51 named $t_{unload}$, e.g. to spin down the record carrier and bring the head to a safe position. A high-priority request 52 arrives during the stand-by period. The scanning elements are powered up, which involves a power-up period 53 named $t_{load}$. During $t_{load}$, the disk device is becoming active again. While the disk device is becoming active, the application can continue emptying the streaming buffer. The best-effort request is processed during a high priority period $be_{hp}$. The application can continue reading from the streaming buffer, while the disk device serves the best-effort request during $be_{hp}$. High-priority best-effort disk access are not collected or postponed, because they need to be served immediately, and are served when they arrive at the scheduler. The disk device is made active and the best-effort request is served. The high-priority best-effort access to the disk device received while the disk device is in standby mode, is processed by reactivating the disk device, serving the best-effort disk access. The combining with a streaming request is achieved by early starting a new storage cycle by filling the stream buffer again as indicated by curve 55.

In an embodiment any pending low-priority best-effort requests are processed immediately after processing the high priority request. The processing of low-priority requests may continue up to the end of the non active period of the cycle, i.e. up to the start of processing of the next streaming request. If necessary the low-priority processing is interrupted and continued after processing a streaming request. However, if the low-priority processing is completed earlier, the device may be switched to stand-by mode or the next cycle may started early be refilling the buffer as described above.

FIG. 6 shows a number of different situations for arrival of a request. In the figure two different phases are distinguished in which the scheduler will be at the moment a new best-effort request arrives: phase I having a refilling curve 61 of the streaming buffer and phase II having an emptying curve 62 of the streaming buffer. Given the estimated period of the (batch of) best-effort requests being served $t_{be}$ we discriminate four different cases:

A. The best-effort request 63 entirely falls within phase I.
B. The best-effort request 64 starts in phase I, and extends into phase II.
C. The best-effort request 65 entirely falls within phase II.
D. The best-effort request 66 starts in phase II, and extends into phase I of the next cycle.

Refilling of the streaming buffer may be started early as explained above with FIG. 5, i.e. directly after the best-effort requests have been served. In parallel, the application can continue reading from the streaming buffer. This requires buffer management to prevent unread buffered data to be overwritten. The consequences for the four different cases are as follows. In cases A, B the best-effort request can only start immediately if the streaming buffer contains enough data to survive the best-effort request. If this isn't the case the best-effort request has to be postponed (for a brief moment) until the streaming buffer has enough data. Effectively this pre-empts the refilling of the streaming buffer for the duration of the best-effort request. Otherwise the best-effort request can start right away. In case C, the best-effort request can be handled without any consequences for the streaming buffer. In situation D, the best-effort has to be interrupted in order to prevent a streaming buffer under run, since the streaming buffer will not survive the best-effort request. The refilling can either be done until the buffer contains just enough data to survive the best-effort request, or by filling the buffer completely at the expense of the best-effort request's response time.

After the best-effort requests have been handled in all four cases described above, a new cycle will be started by refilling the streaming buffer. Effectively this strategy shortens the cycle by starting a new one as soon as the best-effort request arrives, thereby eliminating an extra start-stop cycle. This will result in a reduced number of spin-ups and spin-downs of the drive and hence lower power consumption and increased lifetime of the drive.

In an embodiment, in the event that there are multiple best-effort requests pending, either high or low-priority, they are served as long as the time needed to serve these requests does not exceed the current cycle time. Otherwise, these requests are split and divided over multiple cycles. This is determined based on a calculation of the total period needed compared to the time the streaming buffer will run empty. The best-effort disk access request may not take longer than the remaining time up to the end of the cycle $T_{cycle}$. If it does, then the disk access request should be split and the remainder should be served in another cycle.

In an embodiment the above is applied correspondingly to the case of writing instead of reading streams or a combination of both and multiple-streams. For writing there are also four different situations that can be distinguished. The shapes of the buffer fullness figures are mirrored in shape. In an embodiment for the writing case for recording, flushing the buffer to the storage medium is postponed to the end of a cycle using caching techniques. Writes are postponed until the best-effort cache is full, after which the data is written to the record carrier (flushed) and a new streaming cycle is started. Subsequent best-effort requests reading the not-yet flushed data in a later stage are not processed by retrieving data from disk, but by reading from the internal cache instead.

Furthermore, in an embodiment the real-time streams have a Variable Bit Rate (VBR), and the cycle-times will not be a constant period. The scheduler now constantly monitors the buffer filling, and the refilling (or emptying in the writing case) of the streaming buffer is postponed as long as possible to increase power efficiency and the drive's life-time.

Furthermore, in an embodiment the low-priority best-effort requests are made synchronous in order to avoid data integrity problems. This will stall threads or processes issuing the request until the best-effort request is handled which can be up to tens of seconds. Furthermore it is assumed that error-recovery operations initiated by the drive are split up or postponed to overcome buffer under runs and overflows.

In an embodiment no information about the priority of the auxiliary requests is available from the file system interface issuing the request. For example for legacy file systems this is not available, which means that legacy file system requests always need to be handled as high-priority. This is not desirable, because this leads to higher power consumption. For read requests the following applies. When a legacy file system issues a read request of lets say n sectors, then the scheduler should pre-fetch n+m sectors. The additional m sectors should be stored in a pre-fetch cache. The active period, as indicated as phase I in FIG. 6, is dependent on the minimum sustained bit rate of the hard disk $r_{disk,min}$ and the maximum bit rate of the stream $r_{stream,max}$. The buffer will be filled with a bit rate of $r_{disk,min}$-$r_{stream,max}$, because the application should be able to simultaneously read data from the buffer while it is being filled. The duration of standby period is dependent on the maximum bit rate of the stream and the buffer will be emptied with a bit rate of $r_{stream,max}$. In a practical example the active period takes 5 seconds and the standby period takes 50 seconds. There is a reasonable probability that during those 50 seconds a legacy file system wants to access the hard disk. To reduce the number of unwanted spin-ups for read requests, the scheduler should pre-fetch data from the hard disk. It is very likely that an application will request the next part of a file. Alternatively other data can be pre-fetched based on heuristics or knowledge of the type of application. Depending on the allocation strategy and the size of the allocation units in the file system, there is a reasonable probability that the next requested data is be contiguous to the data requested by an earlier request. An allocation unit is the smallest addressable contiguous block of data on the hard disk defined by the file system. By pre-fetching data, there is a reasonable chance that data for following requests can be retrieved from a pre-fetch cache. Consequently, the hard disk does not need to be spun-up during the standby period. Applying this strategy therefore saves power.

For write requests without priority information a different strategy is as follows. The scheduler queues all write requests during the standby period of the cycle and just acknowledge the file system that the request has been served. The queued write requests can be served as soon as the hard disk has spun-up for the following cycle and has to become active anyway. If an application wants to read data during the standby period that also should have been written during the standby period, the scheduler returns the data directly from the queued write requests.

Although the invention has been mainly explained by embodiments using optical discs, the invention is also suitable for cards or other record carriers such as magnetic discs and corresponding devices. It is noted, that in this document the verb 'comprise' and its conjugations do not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for scanning a record carrier (11) having a track for carrying information, the device comprising
scanning means including drive means (21) for rotating the record carrier and a head (22) for scanning the track for reading and/or writing the information, and
control means (20) for controlling the scanning, the control means including a disc scheduler (36)
for receiving requests for accessing the record carrier, the requests including streaming requests regarding real time information and auxiliary requests regarding auxiliary information,
for reducing power consumption by switching the scanning means to a stand-by mode when no requests are pending and switching the scanning means to an operational mode when a request has to be executed, and
for executing the auxiliary requests in combination with a selected one of the streaming requests.

2. Device as claimed in claim 1, wherein the device comprises
a buffer (32,34) for temporarily storing the information, and
the control means (20) are arranged for generating the streaming requests based on a filling level of streaming information present in the buffer (32,34).

3. Device as claimed in claim 2, wherein the disc scheduler (36) is arranged for said combining by executing an auxiliary request and immediately thereafter generating and executing a streaming request independently of the filling level.

4. Device as claimed in claim 1, wherein the disc scheduler (36) is arranged for said combining by postponing executing an auxiliary request until immediately after executing a streaming request.

5. Device as claimed in claim 1, wherein the disc scheduler (36) is arranged for said combining by determining an expected execution period for a received auxiliary request and by determining a start time for executing a next streaming request, and by postponing executing the received auxiliary request until said start time minus said period or by, in the event that the period extends beyond the start time, starting executing a first part of the received auxiliary request or postponing executing the received auxiliary request until after executing the streaming request.

6. Device as claimed in claim 1, wherein the disc scheduler (36) is arranged for discriminating a received auxiliary request in a high-priority request or a low-priority request, and for, in the event of a high-priority request, immediately executing the high-priority request.

7. Device as claimed in claim 6, wherein the disc scheduler (36) is arranged for executing a low priority request immediately following said executing of the high-priority request.

8. Device as claimed in claim 1, wherein the disc scheduler (36) is arranged for reading additional data immediately following requested data, storing the additional data and, in the event of a next auxiliary request requiring the additional data, providing said stored additional data.

9. Device as claimed in claim 8, wherein the disc scheduler (36) is arranged for discriminating a received auxiliary request in a large-size data request and a small-size data request, and for, only in the event of a small-size read request, reading said additional data.

10. Device as claimed in claim 1, wherein the disc scheduler (36) is arranged for interrupting the execution of a streaming request for executing an auxiliary request, and/or for interrupting the execution of an auxiliary request for executing a streaming request.

11. Method of controlling scanning a record carrier having a track for carrying information, the method comprising
receiving requests for accessing the record carrier, the requests including streaming requests regarding real time information and auxiliary requests regarding auxiliary information,
reducing power consumption by switching scanning means to a stand-by mode when no requests are pending and switching the scanning means to an operational mode when a request has to be executed, and
executing the auxiliary requests in combination with a selected one of the streaming requests.

12. Control unit comprising a program memory for controlling accessing a record carrier, said control unit being operative to cause a processor to perform the method as claimed in claim 11.

* * * * *